Aug. 2, 1966   C. MASSERANT, JR., ETAL   3,264,422
TURN SIGNAL CONNECTING MECHANISM ACCUMULATOR
HAVING PIN AND SLIDE CONNECTION
Filed Dec. 26, 1961                     2 Sheets-Sheet 1

CURTIS MASSERANT, JR.
PAUL J. STRAUB
INVENTORS

BY
ATTORNEYS

Aug. 2, 1966  C. MASSERANT, JR., ET AL  3,264,422
TURN SIGNAL CONNECTING MECHANISM ACCUMULATOR
HAVING PIN AND SLIDE CONNECTION
Filed Dec. 26, 1961  2 Sheets-Sheet 2

CURTIS MASSERANT, JR.
PAUL J. STRAUB
INVENTORS

BY *John R. Faulkner*
*Keith L. Zerschling*
ATTORNEYS

United States Patent Office 3,264,422
Patented August 2, 1966

1

3,264,422
TURN SIGNAL CONNECTING MECHANISM ACCUMULATOR HAVING PIN AND SLIDE CONNECTION
Curtis Masserant, Jr., Allen Park, and Paul J. Straub, Livonia, Mich., assignors to Ford Motor Company, Dearborn, Mich., a corporation of Delaware
Filed Dec. 26, 1961, Ser. No. 161,900
8 Claims. (Cl. 200—61.34)

This invention relates to a turn signaling device for a vehicle. More particularly, the invention relates to a canceling mechanism for a turn signaling device.

Devices for signaling that a vehicle is about to make a turn are well known in the art. These devices generally include a switch operating member which is manipulated by the operator of the vehicle. The switch operating member actuates a switch which, in turn, closes a path through a warning lamp circuit. The lighting of the warning lamp informs nearby drivers that the operator intends to turn the vehicle in a particular direction.

The turn signaling device includes a first sensing means for sensing when the vehicle has completed a turn and for returning the switch operating member to an inoperative position when the completed turn is sensed, thereby terminating the warning signal. Ordinarily, the sensing means is only operative when the steering member of the vehicle has turned through a fixed displacement. When the turn is less than the fixed displacement, the switch operating member will remain in its operative position, causing a false warning signal.

The purpose of the invention is to prevent false warning signals and to automatically return the switch operating member to its inoperative position regardless of the degree of the turn.

When the automobile is traveling along a selected path, the operator continually makes small turns or steering corrections in order to maintain the vehicle along the selected path. The invention utilizes a second sensing means which will sense when the vehicle is going in a selected path or more particularly, the second sensing means will sense the small turns necessary to maintain the vehicle in a selected path. In the usual situation, the operator has just completed a turn and the selected path is a substantially straight path.

The second sensing means comprises a signal means connected to the vehicle steering member and a control means connected to the switch operating member. When the switch operating member has been actuated, the small turns of the vehicle steering member cause the signal means to transmit signals to the control means. When the control means has received a plurality of signals from the signal means, the switch operating member is returned to an inoperative position, thereby terminating the warning signal.

In the preferred embodiment of the invention, the signal means is a pawl and the control means comprises a slidable ratchet member having two sets of teeth and a stop pawl.

The object of this invention is to provide a signal canceling mechanism that will cancel a turn signal and return the switch operating member to an inoperative position regardless of the degree of the turn.

Another object of the invention is to provide a signal canceling mechanism that is reliable, simple and low in cost.

These and other objects and advantages of the invention will become apparent as reference is made to the specification and the drawings, wherein.

Figure 1:
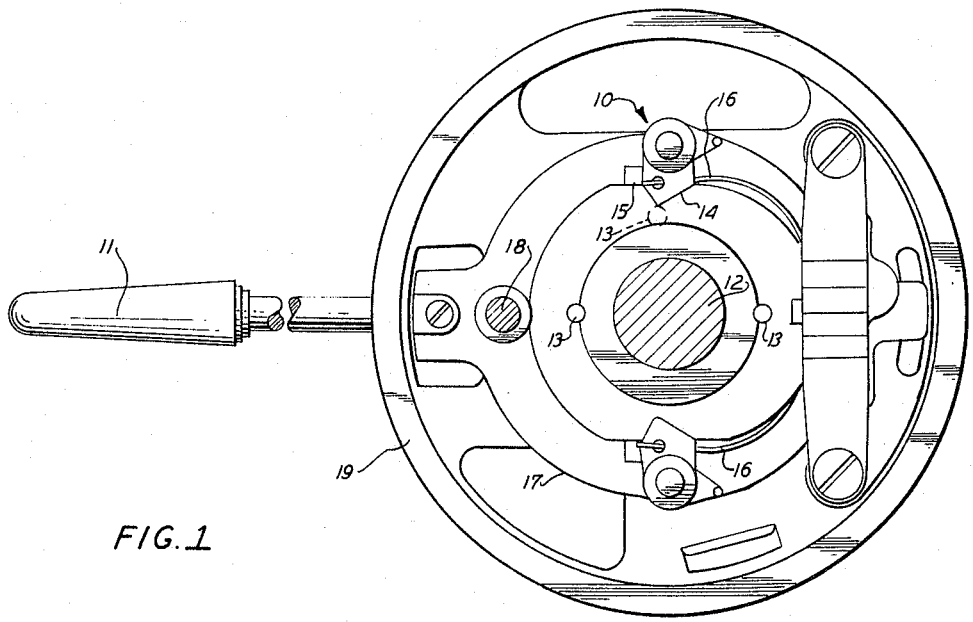
FIGURE 1 is a plan view of a conventional turn signal canceling mechanism.

The turn signal device, shown in FIGURE 1, utilizes a conventional turn signal canceling mechanism. This canceling mechanism has a first sensing means 10 for returning a switch operating member 11 and a movable member or more particularly switch member 17 from an operative to an inoperative position when a fixed displacement of the vehicle steering member has occurred.

The first sensing means 10 may include pins 13 mounted on a vehicle steering member 12, a pawl 14, a stop 15 and a spring 16, all mounted on the switch member 17. When the pins 13 abut the pawl 14, the pawl 14 may, in turn, abut the stop 15. Further rotation of the vehicle steering member 12 when members 13, 14 and 15 are in an abutting relationship will cause a force to be transmitted to the switch member 17. This force causes a torque about a shaft 18, thereby rotating the switch member 17 and the attached switch operating member 11 to an inoperative position.

The above-described sensing means and turn signal canceling mechanism is described in detail in the U.S. Patent No. 2,725,435. Other first sensing means, such as the ones disclosed in U.S. Patent Nos. 2,999,911 and 2,722,577, may be utilized with the second sensing means hereinafter described in detail.

Figure 2:
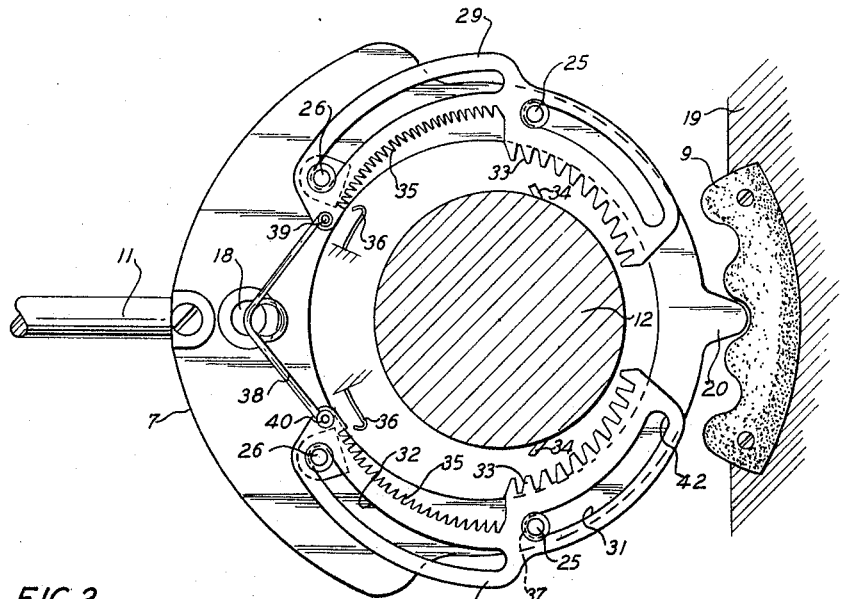
FIGURE 2 is a plan view of the second sensing means of the turn signal canceling mechanism in an inoperative position.

Referring to FIGURE 2, a switch member 7 having an abutment 20 is rigidly attached to the shaft 18. The switch member 7 may be integral with the switch member 17 or may be a separate member. The shaft 18 is pivotally mounted in a casing 19. The casing 19 has a resilient member 9 rigidly attached to it. The resilient member 9 co-operates with the abutment 20 to maintain the switch member in an operative or an inoperative position. The switch member 7 is rotated to an operative or an inoperative position by manually actuating the switch operating member 11.

The switch member 7 has pins 25 and 26 rigidly attached thereto. A slidable accumulator or more particularly the slidable ratchet members 28 and 29 each have a pair of slots 31 and 32 which slidably engage the pins 25 and 26, respectively. The ratchet members 28 and 29 each have two sets of teeth 33 and 35.

When the switch operating member 11 and the switch member 7 are in the inoperative position (FIGURE 2), the left end of the teeth 33 will be adjacent to a signal means or more particularly the pawls 34. The pawls 34 are rigidly attached to the vehicle steering member 12. The pawls 34 are made of a resilient material and are arranged to drive the ratchet members 28 and 29 when moved in one direction while resiliently sliding over the ratchet member when moved in the opposite direction.

It should be noted that there are other arrangements of the elements that would permit a substantially rigid pawl to be used. One such arrangement would utilize a bifurcated switch member 7 made of a resilient material. If such an arrangement was utilized, the switch member 7, rather than the pawl 34, would flex when the pawl 34 was moved in one direction. The switch member 7 would remain rigid when the pawl 34 moved in the other direction.

When the switch operating member 11 is rotated to an operative position, the switch member 7 and one of the ratchet members 28 or 29 will be moved into engagement with one of the pawls 34. The direction of the turn determines the pawl and ratchet member that will be in engagement. The position of the vehicle steering member 12 will determine the portion of the teeth 33 contacted by the pawl 34.

The teeth 35 of the ratchet members 28 and 29 cooperate with the pawls 36. The pawls 36 are shaped to permit movement of the ratchet members 28 and 29 in a direction towards the shaft 18, and prevent movement of the ratchet members 28 and 29 in a direction away from the shaft 18. The pawls 36 are only engaged when the switch operating member 11 has moved the switch member 7 and the ratchet member 28 or 29 from the inoperative position to the operative position.

A torsion spring 38 is fastened to the ratchet members 28 and 29 by the fastening means 39 and 40. When one the pawls 34 actuates one of the ratchet members 28 or 29, the torsion spring 38 will be compressed.

In considering the operation of the preferred embodiment it is assumed that the vehicle steering member 12 has been turned through too small an angle for the first sensing means 10 to return the switch operating member 11 and the switch member 7 to an inoperative position.

Figure 3:
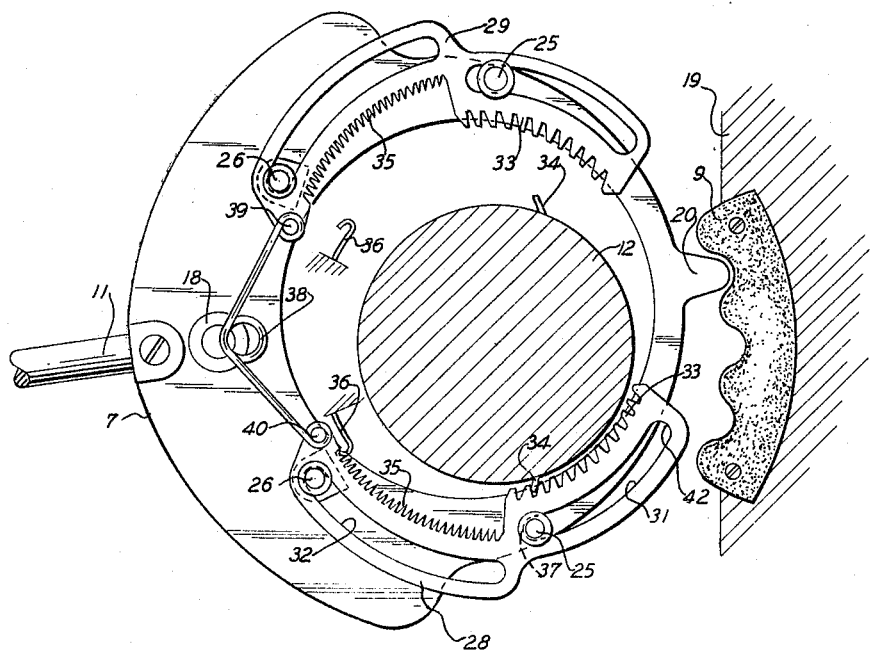
FIGURE 3 is a plan view of the second sensing means of the turn signal canceling mechanism in a left-turn position; and, FIGURE 4 is a plan view of the second sensing means of the turn signal canceling mechanism prior to being returned to an inoperative position by the control means.

The operation of the device with the turn signal in a left-turn signal position will now be considered. The switch operating member 11 is shown in a left-turn position in FIGURE 3. In this position, pawls 34 and 36 are in contact with the teeth 33 and 35, respectively, of the ratchet member 28. With the pawl 34 in contact with the teeth 33, the clockwise adjustments of the vehicle steering member 12 necessary to maintain the vehicle in a selected path will be transmitted to the ratchet member 28. This will tend to drive the ratchet member 28 in a clockwise direction. Subsequent counterclockwise adjustment of the vehicle steering member 12 causes the pawl 34 to slide over the teeth 33.

The pawl 36, which is in engagement with the teeth 35, will permit the ratchet member 28 to slide in a clockwise direction, but will prevent the ratchet member 28 from sliding in a counterclockwise direction. The pawl 36 and the teeth 35, therefore, function to accumulate the movement transmitted to the ratchet member 28 by the pawl 34.

The above-described actuation and accumulation of the movement of the ratchet member 28 will be repeated sporadically as the vehicle steering member 12 is continually adjusted to maintain the vehicle in a straight path. It is apparent that the ratchet members and pawls may be considered as means for sensing the zero position of the steering wheel, that is when the operator is attempting to manipulate the vehicle along a straight path, the pawls may actuate the ratchet members.

Figure 4:
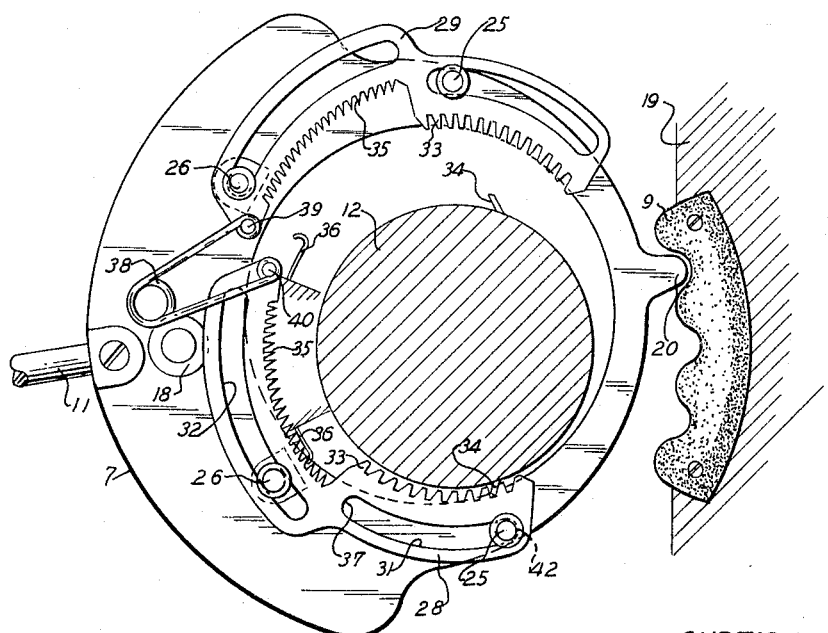

As the movement of the ratchet member 28 is accumulated, a slot 31 will slide from a first position with the left end 37 of the slot 31 abutting the pin 25 (FIGURE 3) to an end position with the right end 42 of the slot 31 abutting the pin 25 (FIGURE 4). When the left end 42 abuts the pin 25, sliding of the ratchet member 28 will be prevented. Further clockwise actuation of the teeth 33 by the pawl 34, with the right end 42 of the slot 31 abutting the pawl 25, will cause the switch member 17 and the switch operating member 11 to be moved in a clockwise direction. The movement of the switch member 7 and the switch operating member 11 in a clockwise direction will return these members to an inoperative position.

It should be readily apparent from the above description that the signal canceling means which embodies the invention is capable of canceling the turn signal regardless of the degree of turn which the automobile experiences.

It will be understood that the invention is not to be limited to the exact construction shown and described and that various changes and modifications may be made without departing from the spirit and scope of the invention, as defined in the appended claims.

We claim:

1. In a turn signaling mechanism the combination comprising: a vehicle steering member, said steering member having a zero position for steering the vehicle in a straight path, a movable switch member, said switch member having an operative and an inoperative position, a switch operating means connected to move said switch member from an inoperative position to an operative position, a first sensing means operatively coupled to said steering member and said switch member for sensing a fixed movement of said steering member and for returning said switch member from said operative position to said inoperative position when said fixed movement is sensed, a second sensing means, said second sensing means comprising an elongate accumulator mounted by means of a pin and slot connection for sliding movement on one of said members and having a first position and an end position, said accumulator adapted to move said switch member and said switch operating means to an inoperative position when said accumulator is slidably moved to said end position, and a signal means operatively coupled to one of said members for transmitting a signal from said vehicle steering member to said accumulator upon relative movement of said switch member and said steering member when said switch member is in an operative position, whereby said accumulator is moved from said first position to an end position to enable said accumulator to return said switch member and switch operating means to an inoperative position.

2. In a turn signaling mechanism the combination comprising: a vehicle steering member, said steering member having a zero position for steering a vehicle in a straight path, a movable switch member, said switch member having an operative and an inoperative position, a switch operating means connected to move said switch member from an inoperative position to an operative position, a sensing means operatively coupled to said switch member and said vehicle steering member for sensing the zero position of said vehicle steering member and for returning said switch member to an inoperative position when said zero position of said vehicle steering member is sensed, said sensing means comprising, an elongate accumulator means mounted by means of a pin and slot connection for sliding movement on one of said members and having a first position and an end position, said accumulator means operatively coupled to said switch member and adapted to return said switch member to an inoperative position when said accumulator means is slidably moved to said end position, and a signal means operatively coupled to one of said members for transmitting a signal from said vehicle steering member to said accumulator means upon relative movement between said members when said switch member is in an operative position, whereby said accumulator means is moved from said first position to an end position to enable said accumulator means to return said switch member and said switch operating means to an inoperative position.

3. In a turn signaling mechanism, the combination comprising: a vehicle steering member, said steering member having a zero position for steering the vehicle in a straight path, a movable switch member, said switch member having an operative and inoperative position, a switch operating means connected to move said switch member from an inoperative position to an operative position, a sensing means for sensing the zero position of said vehicle steering member and returning said switch member to an inoperative position when said zero position of said vehicle steering member is sensed, said sensing means comprising, a slidable elongate member mounted by means of a pin and slot connection for sliding movement on said switch member, said slidable member adapted to incrementally slide from a first position to an end position, an abutment member attached to said switch member, said slidable member in contact with said abutment member when said slidable member is in the end position, whereby further movement of said slidable member will cause said switch member to be moved from an operative to an inoperative position, an actuating means operatively coupled to said vehicle steering member and engaging said slidable member when said switch member is in an operative position for transmitting the corrective movement of the vehicle steering member about the zero position to said slidable member, thereby sliding said slidable member from said first position through said end position.

4. In a turn signaling mechanism, the combination comprising: a vericle steering member, said vehicle steering member having a zero position for steering the vehicle in a straight path, a movable switch member, said switch member having an operative and an inoperative position, a switch operating means connected to said switch member to move said switch member from an inoperative position to an operative position, a sensing means for sensing the zero position of said steering member and for returning said switch member to an inoperative position when said zero position of said vehicle steering member is sensed, said sensing means comprising, a slidable elongate member mounted by means of a pin and slot connector for sliding movement on said switch member, said slidable member adapted to incrementally slide from a first position to an end position, an actuating means operatively coupled to said vehicle steering member and operatively engaging said slidable member when said switch member is in an operative position for transmitting the corrective adjustments of said vehicle steering member about said zero position to said slidable member, thereby incrementally sliding said slidable member, a stop member mounted adjacent said slidable member and engaging said slidable member for maintaining said slidable member in any incremental position that said slidable member assumes in moving from said first position to said end position, an abutment member attached to said switch member, said abutment member in contact with said sliding member when said sliding member is in said end position, whereby any further movement of said vehicle steering member about the zero position will be transmitted to said abutment member to move said switch member to an inoperative position.

5. In a turn signal mechanism the combination comprising: a vehicle steering member for steering a vehicle, a switch member movably mounted adjacent to said vehicle steering member, said switch member having an operative and an inoperative position, a switch operating means connected to said switch member, a first sensing means coupled to said steering member and said switch member for sensing the movement of said steering member and for returning said switch member from said operative to said inoperative position when said fixed movement is sensed, a second sensing means, said second sensing means comprising, an elongate ratchet member mounted by means of a pin and slot connection for sliding movement on said switch member and adapted to move said switch member and said switch operating member to an inoperative position when moved through a given displacement, and an actuating means adapted to engage said ratchet member when said switch member is in the operative position for moving said ratchet member, said actuating means operatively coupled to said vehicle steering member.

6. In a turn signal mechanism the combination comprising: a vehicle steering member for steering a vehicle, a switch member movably mounted adjacent to said vehicle steering member, said switch member having an operative and an inoperative position, a switch operating means connected to said switch member, a sensing means, said sensing means comprising, a slidable elongate ratchet means operatively coupled for sliding movement to said switch member by a pin and slot connection for moving said switch member and said switch operating means to an inoperative position when moved through a given displacement, said slidable ratchet means adapted to be moved incrementally through said given displacement, and an actuating means engaging said slidable ratchet means when said switch member is in an operative position for incrementally moving said slidable ratchet means, said actuating means operatively coupled to said vehicle steering member.

7. In a turn signal mechanism the combination comprising: a vehicle steering member for steering a vehicle, a switch member movably mounted adjacent to said vehicle steering member, said switch member having an operative and an inoperative position, a switch operating means connected to said switch member, a first sensing means operatively coupled to said steering member and said switch member for sensing the movement of said steering member and for returning said switch member from said operative to said inoperative position when said fixed movement is sensed, a second sensing means, said second sensing means comprising, an elongate accumulator slidably mounted by means of a pin and slot connection on said switch member and having a first position and an end position, said accumulator adapted to move said switch member and said switch operating means to an inoperative position when the accumulator is moved to said end position, and an actuating means connected to said vehicle steering means and coupled to said slidable accumulator when said switch member is in an inoperative position for moving said accumulator from said first position to said end position.

8. In a turn signal mechanism the combination comprising: a vehicle steering member for steering a vehicle, a switch member movably mounted adjacent to said vehicle steering member, said switch member having an operative and an inoperative position, a switch operating means connected to said switch member, a sensing means, said sensing means comprising, a slidable elongate accumulator means having a first position and an end position and adapted to be incrementally moved from said first to said end position, said slidable accumulator means operatively coupled to said switch member by a pin and slot connection and operative to move said switch member and said switch operating means to an inoperative position when the slidable accumulator is moved to said end position, and an actuating means connected to said vehicle steering means and engaging said slidable accumulator when said switch member is in an operative position for incrementally moving said slidable accumulator from said first position to said end position.

References Cited by the Examiner
UNITED STATES PATENTS

| Re. 5,263 | 1/1873 | Otstot | 74—169 |
| 1,928,315 | 9/1933 | Martin et al. | 200—61.32 |
| 2,717,331 | 9/1955 | Hollins | 200—61.27 |
| 2,725,435 | 11/1955 | Cislo | 200—61.34 |
| 3,020,774 | 2/1962 | Kullman | 74—142 |
| 3,190,981 | 6/1965 | Brown | 200—61.34 |

BERNARD A. GILHEANY, *Primary Examiner.*

H. A. LEWITTER, *Assistant Examiner.*